United States Patent [19]
Lassiter

[11] Patent Number: 5,687,928
[45] Date of Patent: Nov. 18, 1997

[54] RACK FOR WIRE DISPENSING SPOOLS

[76] Inventor: Daniel T. Lassiter, 9918 Nichols Rd., Windham, Ohio 44288

[21] Appl. No.: 555,973

[22] Filed: Nov. 13, 1995

[51] Int. Cl.⁶ .......................... B65H 16/02; B65H 49/00; B65H 18/02
[52] U.S. Cl. .................. 242/557; 242/588; 242/588.2; 242/594.1; 242/595; 242/129.5
[58] Field of Search .......................... 242/557, 588, 242/588.2, 594.1, 594.2, 129.5, 595

[56] References Cited

U.S. PATENT DOCUMENTS

| | | |
|---|---|---|
| 340,265 | 4/1886 | West . |
| 991,827 | 5/1911 | Capers . |
| 1,009,827 | 11/1911 | Capers . |
| 1,929,160 | 10/1933 | Bellocchio ........................... 242/68 |
| 2,660,381 | 11/1953 | Friedl et al. .......................... 242/557 |
| 2,949,248 | 8/1960 | Flynn et al. .......................... 242/55.3 |
| 2,957,638 | 10/1960 | Schiller et al. ...................... 242/595 X |
| 3,134,555 | 5/1964 | Baker ................................... 242/86.5 |
| 3,375,991 | 4/1968 | Conforti et al. ..................... 242/66 |
| 3,685,760 | 8/1972 | Fedor .................................... 242/78.7 |
| 3,743,205 | 7/1973 | Misrach ................................ 242/68.7 |
| 3,856,230 | 12/1974 | Zimmer ................................ 242/86.5 |
| 4,176,801 | 12/1979 | Douglas ............................... 242/54 |
| 4,537,106 | 8/1985 | Rider .................................... 242/129.5 X |
| 4,838,497 | 6/1989 | Kramer et al. ....................... 242/67.2 |
| 4,978,085 | 12/1990 | Letourneau .......................... 242/85 |
| 5,308,012 | 5/1994 | Fuller ................................... 242/86.5 |
| 5,316,232 | 5/1994 | Lambert, Jr. ........................ 242/86.5 |

FOREIGN PATENT DOCUMENTS 2258230  8/1975  France ................................ 242/129.5

*Primary Examiner*—John Q. Nguyen
*Attorney, Agent, or Firm*—Sand & Sebolt

[57] ABSTRACT

A rack for rotatably mounting one or more wire dispensing spools. A set of four rollers extend horizontally between a pair of spaced parallel side walls and are positioned in a substantially square-shaped configuration and rotatably mount and retain the spools therebetween. Each roller includes a cylindrical low friction plastic sleeve mounted on a center support rod or axle. A plurality of spacers separate the sleeve into a plurality of sleeve sections allowing the spools to rotate independently of each other without affecting the rotation of adjacent spools. A top roller of each set is spring biased and moves horizontally within a pair of aligned slots formed in the spaced side walls allowing the spring biased roller to move horizontally toward and away from the other top roller of each set enabling the spools to be easily inserted or removed from the rack. Front and rear wheels and a handle allow the rack to be used as a cart to transport the spools and other equipment and materials to and from the work site. In a second embodiment the rack may be hand carried and contain only one four roller set.

17 Claims, 3 Drawing Sheets

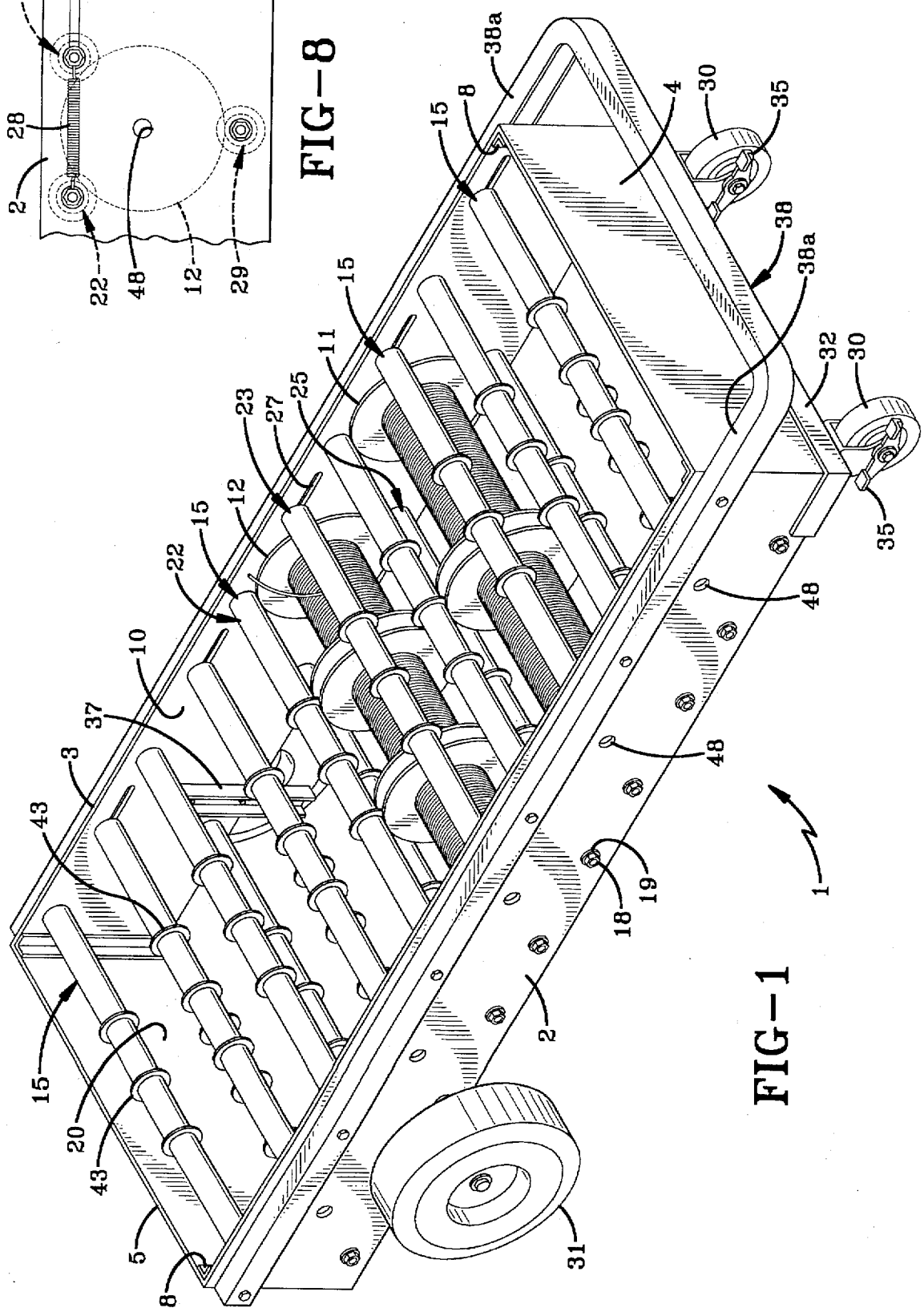

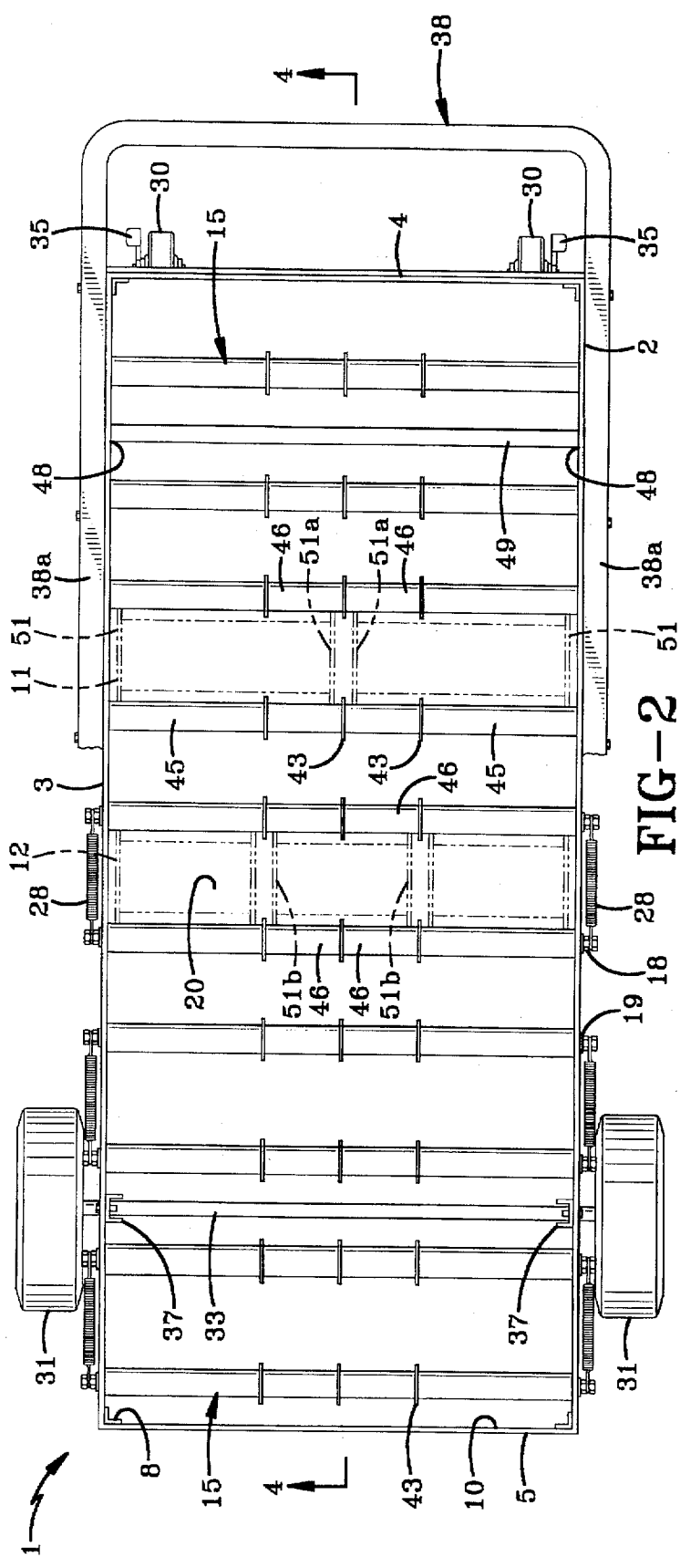
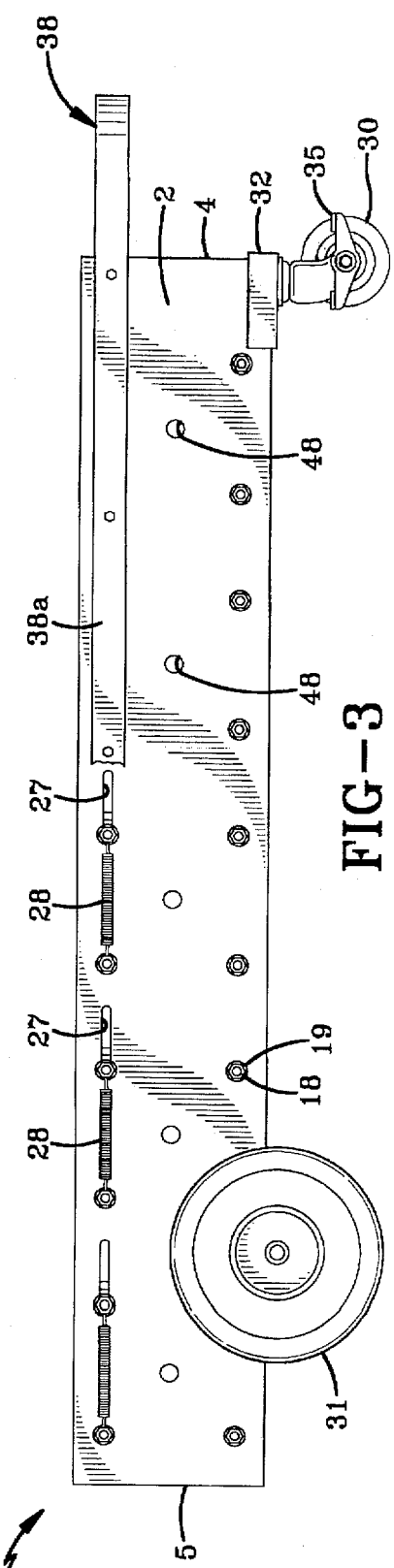

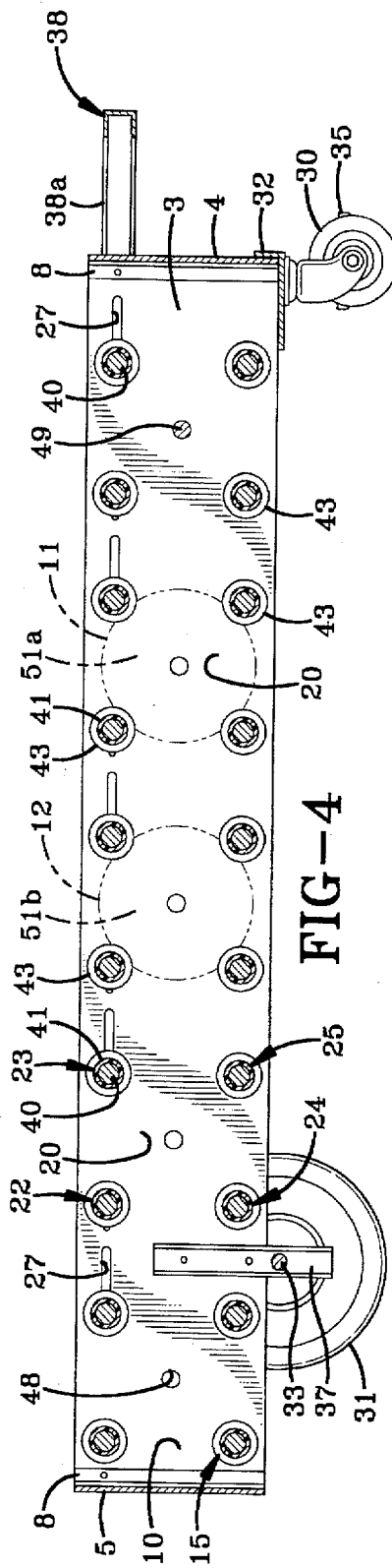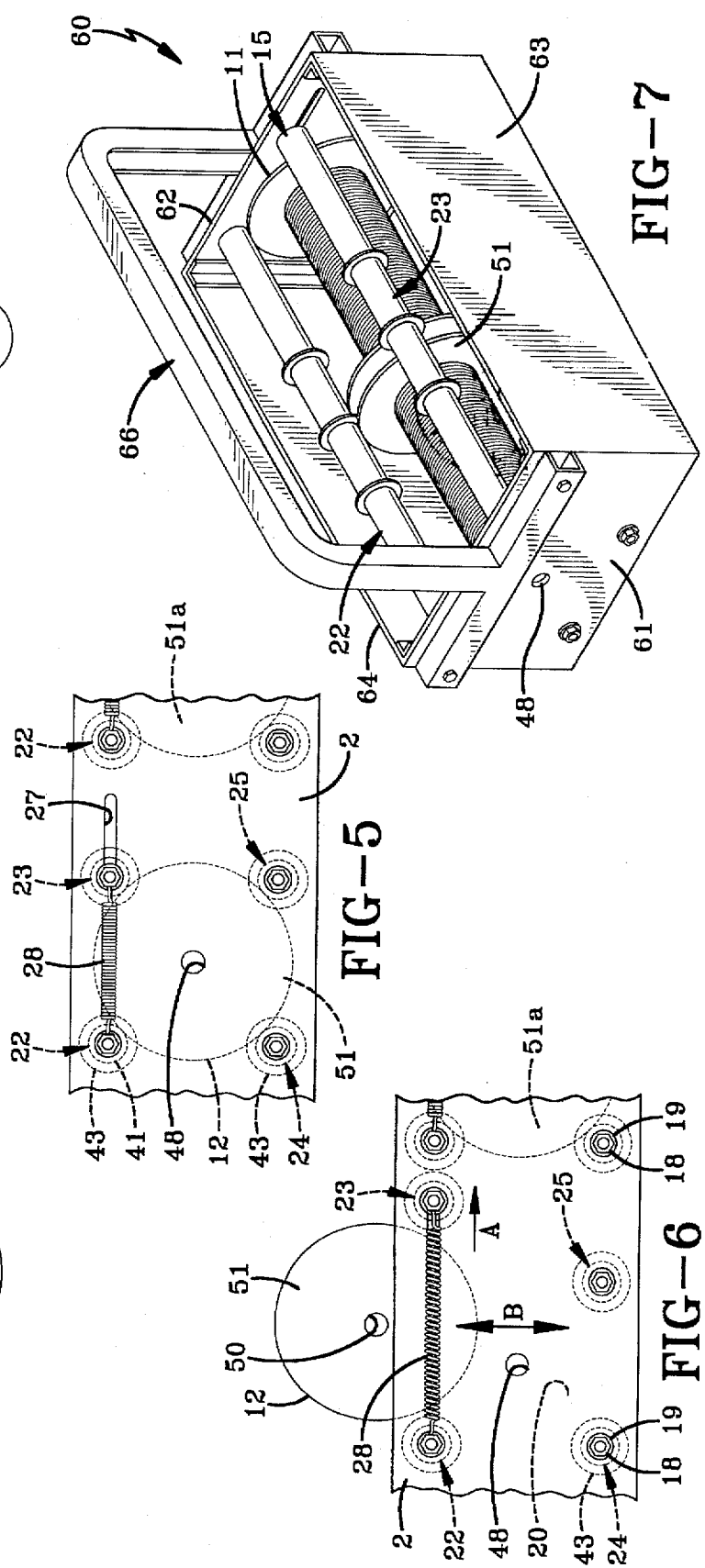

RACK FOR WIRE DISPENSING SPOOLS

BACKGROUND OF THE INVENTION

1. Technical Field

The invention relates to a rack for wire dispensing spools. More particularly, the invention relates to a rack which holds spools of wire for dispensing the contents thereon. Even more particularly, the invention relates to a rack for wire dispensing spools which is free of a center axle and which uses a set of rollers to hold the spools in place, one roller being spring biased to allow for easy insertion and removal of the spools into and from the rack.

2. Background Information

Current racks for wire dispensing spools include a center axle that runs through the opening formed in the center of a usual wire spool. The spool rotates on the axle as the wire is pulled and dispensed from the spool. Many of these racks allow the spool to rotate freely while the wire is being dispensed. When an electrician pulls the desired amount of wire the spool will often continue to rotate until it frictionally stops, and because the wire is no longer being pulled a backlash of loose wire is created on the spool. This backlash will often result in the loose wire overriding the sides of the spool and becoming entangled or wrapped around the support axle. A backlash condition also may occur when full reels are installed in the rack. The resilient properties of the wire cause the wire to spring from the spool and become entangled or wrapped around the axle if the wire is not kept taut during installation or if the end of the wire is not secured during storage. When these conditions occur the electrician must stop working and walk back to the wire rack to untangle the wire from the axle.

Wires of various gauges often must be dispensed during commercial electrical installations. Many conventional racks are capable of only holding a single spool. The electrician is then required to purchase multiple racks in order to properly and quickly complete the wire installation which is an additional expense to the electrician. These multiple racks and wires of various gauges as well as other installation tools and materials must be transported between the electrician's work truck or a storage area to the work site.

Another problem with axially rod or axle mounted wire racks is that if more than one spool is mounted on a single axle the electrician must at least partially remove the axle from the rack to change an empty spool, and in some instances other spools must be completely removed to access the empty spool. This respooling process is cumbersome, unproductive and time consuming.

Several prior art racks for wire dispensing spools have addressed some of the above described problems. For example U.S. Pat. No. 5,316,232 shows a wire dispensing cart capable of dispensing multiple wires simultaneously. The dispenser includes a rectangularly-shaped frame with axial spool holders and pairs of spool tension bars corresponding to each holder. The tension bars apply friction to the rims of the spools to prevent the spools from continuing to rotate and to prevent a backlash of the wire.

U.S. Pat. No. 5,308,012 shows a folding wirecart convertible into float and handtruck. The wirecart includes a body with a plurality of axles to accommodate wire spools, rotatably attached to a base.

U.S. Pat. No. 4,176,801 shows a device for rotatably supporting a drum or reel. Vertical flanges of respective L-shaped members are spaced apart to receive the circular end flange of the cable drum. The drum flange is supported on roller bearings mounted between the L-shaped members. The device also includes a toggle-type mechanism which extends from an undamaged drum flange and allows the undamaged drum flange to be attached to a damaged drum flange to permit the drum to smoothly rotate between the L-shaped members.

U.S. Pat. No. 4,978,085 shows a dispenser for stiff resilient wire such as guy wire. The wire spool is enclosed in a box-shaped casing having an upwardly rearwardly opening diagonal cover and is rotatably mounted therein on three corner-mounted transverse rollers within the casing and one transverse roller in the cover. The wire is wound and dispensed from the device through an opening formed in the bottom front of the casing.

U.S. Pat. No. 3,856,230 shows a wire dispensing cart which is a combination of a usual two-wheeled hand dolly and a rigid supplemental frame superstructure fixedly mounted on the dolly. The superstructure includes a pair of elongated laterally spaced side frame members with aligned openings to removably receive spindles of edge-flanged product reels. A plurality of elongated straps frictionally restrain either a reel and flange or a spindle for a reel.

U.S. Pat. No. 3,743,205 shows a self-centering reel support with at least a front roller and a rear roller supported between frame members. The front roller has integral surfaces positioned so as to cooperate with the back roller to center a supported reel against excessive axial translation when a strip material is pulled off the reel. The front and rear rollers may be a set of two rollers which may be cylindrical to tapered and which are positioned to center a supported reel.

U.S. Pat. No. 3,375,991 shows a multiple spool wind-up device. The spools are straddled between a drive shaft, which when rotated, drives the spools in rotation and a support shaft having thereon rotatable idler members for each spool such that the spools can be rotated at different speeds.

U.S. Pat. No. 3,134,555 shows a carrying and dispensing device for spool mounted wire. The device axially mounts a plurality of spools on a frame member with each spool having its own separate axle.

Further examples of racks for wire dispensing spools are shown in U.S. Pat. Nos. 4,838,497, 3,685,760, 2,949,248, 1,929,160, 1,009,827 and 991,827, 340,265.

Although these prior art racks may be adequate for the purpose for which they were intended, unlike the rack of the present invention, these racks either include a center axle upon which the spool is mounted or the spool sits and rotates on a rack. The present invention is free from a center support axle and includes a set of rollers which create a storage zone therebetween and which positively hold the spools and allow them to be easily inserted and removed from the rack.

Therefore, the need exists for an improved rack for wire dispensing spools which is free of a center axle and which enables one or more spools to be inserted into or removed from the rack without disturbing the other spools contained therein. There is no such rack of which I am aware that accomplishes these results.

SUMMARY OF THE INVENTION

Objectives of the present invention include providing an improved rack for wire dispensing spools which is capable of holding a plurality of various size spools usually containing ten to twenty-two gage wire.

Another objective of the invention is to provide an improved rack for wire dispensing spools which is free of a center axle and which uses a set of rollers which extend completely across the rack to hold the spools in place, one roller being spring biased to allow for easy insertion and removal of the spools.

A further objective of the invention is to provide an improved rack for spools which allows the spools to rotate independently of one another.

A still further objective of the invention is to provide an improved rack for spools which allows the spools to be added and removed from the rack without interfering with the use of other spools.

Another objective of the invention is to provide an improved rack for spools which includes wheels to allow the rack to contain a large number of spools and which can easily transport the spools and other equipment to and from a work site, or can be hand carried when used with a relatively few spools.

These objectives and advantages are obtained by the improved wire rack for dispensing spools of the present invention, the general nature of which may be stated as including a frame which includes at least two spaced side walls; a pair of spaced top rollers and at least one bottom roller spaced below said top rollers extending between the two side walls for loosely holding at least one spool in a storage zone located between said rollers; spring means for biasing one of the top rollers towards the other of said top rollers; and means mounting the said one top roller for allowing said one top roller to move with respect to said other top roller and overcome the biasing of the spring means to change the space between said top rollers for inserting and removing a spool into and from the storage zone.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 1 is a perspective view of the rack of the present invention showing a plurality of spools being held therein;

FIG. 2 is a top plan view of the rack of FIG. 1 with portions of the handle broken away and with a plurality of spools shown in dot dash lines;

FIG. 3 is a side elevational view of the rack of FIG. 2;

FIG. 4 is a sectional view of the rack taken along line 4—4, FIG. 2;

FIG. 5 is an enlarged fragmentary view showing a spool in dot dash lines being held in place by a set of four rollers;

FIG. 6 is an enlarged fragmentary view similar to FIG. 5, showing the spring biased movement of a top roller during insertion or removal of a spool;

FIG. 7 is a perspective view showing a second embodiment of the rack of the present invention as a hand held carrier with a pair of spools being shown held therein; and FIG. 8 is a fragmentary view similar to FIGS. 5 and 6 showing another arrangement of the rollers.

Similar numbers refer to similar parts throughout the drawings.

DESCRIPTION OF THE PREFERRED EMBODIMENTS

The rack for wire dispensing spools of the present invention is shown in FIG. 1, and indicated generally at 1. Rack 1 has a rectangularly-shaped configuration and includes vertical spaced parallel side walls 2 and 3 and vertical spaced parallel front and rear walls 4 and 5, respectively. Walls 2 and 3 are connected to walls 4 and 5 by a plurality of L-shaped brackets 8 forming a storage area 10 which preferably is open on the top and the bottom.

In accordance with one of the main features of the invention, a plurality of rollers extend between side walls 2 and 3 (FIGS. 1 and 2) and form a roller set indicated generally at 15. The ends of each roller are threaded and extend through holes formed in side walls 2 and 3 and are secured thereto by nuts 18 and washers 19. A set of four rollers are positioned in a rectangular-shaped configuration, two upper and two lower to hold usual spools 11 and 12 (FIG. 2) of the same or various lengths, which usually hold ten to twenty-two gauge wire 13. The roller sets each form a storage zone 20 therebetween. In the preferred embodiment rack 1 includes five sets of four rollers, with each set having a pair of top rollers 22 and 23 which are spaced approximately 5½ inches apart, and a pair of bottom rollers 24 and 25 which also are spaced approximately 5½ inches apart (FIG. 5).

Each roller 23 extends through a horizontally extending slot 27 formed in side walls 2 and 3. A tension spring 28 is attached to and extends between rollers 22 and 23 and biases each roller 23 towards it respective roller 22 (FIG. 2). The ends of spring 28 preferably are hook-shaped and extend partially about the outer ends of rollers 23. Slots 27 allow rollers 23 to move horizontally away from rollers 22 (arrow A, FIG. 6) when a spool is manually inserted or removed from rack 1 by a worker, as shown by arrow B in FIG. 6.

Rack 1 includes a pair of front and rear wheels 30 and 31, respectively. Front wheels 30 are attached to rack 1 by a bracket 32 which extends along the bottom of front wall 4 and partially along side walls 2 and 3. Front wheels 30 may include a usual braking mechanism 35 which prevents movement of rack 1 while wire 21 is being dispensed therefrom. An axle 33 (FIG. 2) extends between wheels 31 and is attached to rack 1 by a pair of vertically extending brackets 37 which are fastened to the rear of side walls 2 and 3.

A U-shaped handle 38 preferably extends horizontally along side walls 2 and 3 and beyond front wall 4 enabling rack 1 to be moved easily by a worker. Handle 38 includes a pair of spaced legs 38a which extend along side walls 2 and 3 and enclose the ends of rollers 22 and 23, springs 28 and slots 27, protecting a user from injury by pinching or tangling anything within springs 28 and preventing damage to the springs 28.

In accordance with still another feature of the invention, each of the rollers preferably includes a rigid metal axle rod 40 (FIG. 4) concentrically contained within and extending through a cylindrical sleeve 41 formed of low friction plastic material. A plurality of spacers 43 preferably are mounted on each rod 40 and separate each sleeve 41 into a plurality of sleeve sections. Spacers 43 preferably are annular metal or plastic washers. A pair of end sections 45 of sleeve 41 are approximately 7 inches in length and a pair of middle sections 46 are approximately 3½ inches in length. Sections 45 and 46 allow each roller set 15 to hold up to two long spools 11 (FIG. 2) or up to three shorter spools 12.

Long spools 11 are approximately 10½ inches in length and fit between side walls 2 and 3 and middle spacer 43. A first end flange 51 of spools 11 is positioned on end section 45 and a second end flange 51a is positioned on the adjacent middle section 46 allowing spools 11 to rotate independently of one another thus preventing the rotation of one spool 11 from affecting the rotation of the other spool 11. Similarly, short spools 12 are positioned in rack 1 to allow for independent rotation of each spool. Short spools 12 are approximately 7 inches in length with one spool 12 positioned on each end section 45 and one end flange 51b of a third spool 12 positioned on each middle section 46.

A plurality of circular holes 48 are formed in side walls 2 and 3 and align with center bores 50 (FIG. 6) formed in the cylindrical hubs of spools 11 and 12 when the spools are held in rack 1. Should an end flange 51 of a spool be bent or damaged which will impede the rotation of the spool on the rollers, an auxiliary rod or axle 49 (FIG. 2) can be inserted through a pair of aligned holes 48 and spool bore 50 to support the spool on the auxiliary axle or rod and allow the damaged spool to rotate until empty.

In operation, spool 12 for example, is inserted into rack 1 by applying a downward force on the spool while the spool is positioned between and on top of rollers 22 and 23. A cam-type action is produced between end flanges 51 of spool 12 and rollers 22 and 23 stretching spring 28 and forcing roller 23 to slide horizontally in slot 27 in the direction of arrow A. Spool 12 is forced down as shown by the downward portion of arrow B (FIG. 6) until the spool flanges contact bottom rollers 24 and 25, afterwhich spring 28 pulls roller 23 back to its static position loosely trapping the spool within zone 20 of roller set 15.

Each of the rollers 22–25 contacts the perimeter of the spools and loosely holds the spools and allow the spools to rotate therebetween when wire 13 is dispensed (FIGS. 1, 4 and 6). Springs 28 apply a constant pressure on each roller 23 causing the roller to apply a constant angularly downward pressure on spool 12 preventing the spool from being pulled from rack 1 while wire 13 is being dispensed. The low friction of plastic sleeve 41 permits sleeve 41 to rotate around axle rod 40 as spool 12 is rotated when a free end of wire 13 is being pulled by an electrician. The constant contact between rollers 22–25 and spool 12, and the exclusion of a center axle prevent the wire from overriding the sides of the spools and tangling with the adjacent spools. Spacers 43 separate the spools from one another preventing the movement of one spool from affecting the movement of adjacent spools.

When a spool is empty it is replaced quickly and easily by applying an upward force on the spool as shown as shown by the upward portion of arrow B (FIG. 6). A cam-type action is again produced between the end flanges of the spool and rollers 22 and 23, and spring 28 is stretched in the direction of arrow A as roller 23 moves horizontally within slot 27. Spool 11 is used in rack 1 in a similar manner to spool 12 thus allowing spools 11 and 12 to be easily and independently inserted and removed from rack 1 without removing or interfering with the other spools stored on the rack.

Braking mechanism 35 locks front wheels 30 and prevents rack 1 from moving while wire is being dispensed from one or more of the spools. Rack 1 also may include a leg or brace (not shown) which is pivotally mounted on and extends from the rack to support rack 1 in a generally upright position.

If desired, the rollers can be constructed of a steel tubing or steel bar eliminating the need for plastic sleeve 41 without affecting the concept of the invention. The increased friction between the rotating spools and the stationary steel tubing reduces the affect that a rotating spool will have on a neighboring spool and eliminates the need for spacers 43.

Although the above description of the preferred embodiment of rack 1 uses a set of four rollers to positively hold the spools, rack 1 may include two upper rollers and only one lower roller 29 positioned centrally between and below the two upper rollers as shown in FIG. 8.

In accordance with the many advantages of rack 1 it may be used to dispense various spooled materials such as chains, rope, cotton, hose, etc. Rack 1 also may be constructed in many different sizes to accommodate the various sizes of spools. Wheels 30 and 31 and handle 38 allow rack 1 to be easily transported to a work site, and because rack 1 extends generally in a horizontal plane it can be used as a cart to transport and carry other tools and materials to and from the work site. Also, the absence of any top and bottom walls reduce the weight of rack 1 and prevents the accumulation of dirt and debris therein.

A second embodiment of the rack of the present invention is shown in FIG. 7 and is indicated generally at 60. Rack 60 has a box-like configuration formed by vertical spaced parallel side walls 61 and 62 and front and rear wall 63 and 64, respectively. Rack 60 is a hand-held version of rack 1 containing one set 15 of four rods capable of holding two long spools 11 or three short spools 12. A handle 66 extends from side walls 61 and 62 and allows rack 60 to be carried like a tool box.

Accordingly, rack 1 includes at least one or more sets of four rollers 15, or three rollers if desired, which contact and hold one or more wire spools around end flanges 51 thereof. Rollers 22–25 are positioned in a rectangular-shaped configuration and constitute a roller set 15 with each set capable of holding one or a plurality of different size spools. Furthermore, the rollers may include either a steel tube with the spools rotating directly thereon or use low friction sleeves 41 which rotate on axle rods 40. Spacers 43 separate sleeves 41 into a plurality of sleeve sections and prevent the rotation of the spools from affecting the rotation of adjacent spools. Additionally, top rollers 23 are biased by springs 28 and move horizontally to allow the spools to be easily inserted into and held by rack 1. Also, the constant contact of rollers 22–25 with the flanges 51 of spools 11 and 12, and the exclusion of a center axle prevent wire 13 from overriding the end flanges and tangling with the center axle or adjacent spools. Moreover wheels 30 and 31 and handle 38 allow rack 1 to be used as a cart to transport equipment and materials to and from the work site.

Accordingly, the improved rack is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved rack for wire dispensing spools is constructed and used, the characteristics of the construction, and the advantageous, new and useful results obtained; the new and useful structures, devices, elements, arrangements, parts and combinations, are set forth in the appended claims.

I claim:

1. A rack for rotatably supporting one or more spools including:
   a frame which includes at least two spaced side walls;
   a pair of spaced top rollers and at least one bottom roller spaced below said top rollers, said top and bottom rollers extending between the two side walls for holding at least one spool in a storage zone located between said rollers;
   spring means for biasing one of the top rollers towards the other of said top rollers; and
   means mounting the said one top roller for allowing said one top roller to move with respect to said other top roller and overcome the biasing of the spring means to change the spacing between said top rollers for inserting and removing a spool into and from the storage zone.

2. The rack defined in claim 1 including a spool; in which a plurality of pairs of aligned holes are formed in the side walls; and in which a rod is mounted in an aligned pair of said holes and extend between said side walls for rotatably mounting said spool between the side walls.

3. The rack defined in claim 1 in which certain of the rollers includes a rod covered by a cylindrical low friction plastic sleeve.

4. The rack defined in claim 3 in which said certain rollers each includes a plurality of circular spacers mounted on the rod dividing the low friction plastic sleeve into a plurality of sleeve sections.

5. The rack defined in claim 4 in which certain of the sleeve sections are approximately seven inches in length and certain others of said sleeve sections are approximately three and one-half inches in length.

6. The rack defined in claim 4 in which the circular spacers are annular washers mounted concentrically on the rod.

7. The rack defined in claim 1 in which the spring means includes a pair of tension springs, each of which is fastened to opposite ends of each of the top rollers.

8. The rack defined in claim 1 including a plurality of wheels mounted on the frame for movably mounting the cart and a handle for movement of the rack on said wheels.

9. The rack defined in claim 8 in which the handle is U-shaped having a pair of legs extending along the side walls of the frame with said spring means being located within said legs to conceal said spring means.

10. The rack defined in claim 8 in which at least one of the wheels includes a braking mechanism engageable with said one wheel for braking said wheel for keeping the rack stationary while in use.

11. The rack defined in claim 1 in which a pair of bottom rollers are positioned between the side walls; and in which top and bottom roller pairs are mounted in a square-shaped configuration with one roller at each corner to hold the spools in the storage zone.

12. The rack defined in claim 11 in which said rack includes only one set of spaced top and bottom rolls; and in which a handle is mounted on the two side walls of the frame for manually lifting and carrying said rack.

13. The rack defined in claim 11 including a spool having a pair of end flanges movably supported on the spaced bottom rollers.

14. The rack defined in claim 13 in which the top two rollers are adapted to engage the spool end flanges to trap the spool within the storage zone.

15. In combination at least one spool having a pair of spaced annular flanges and an intervening hub, and a rack for rotatably mounting said spool for dispensing material wound about said hub, said rack including:
   a frame having at least a pair of spaced side members;
   a plurality of rods including a pair of upper rods and at least one lower rod providing a rod set extending between the side members and forming a zone between said rods for rotatably mounting and trapping the spool therein with the lower rod engaging the spool flanges and supporting the spool within said zone and the upper two rods loosely trapping the spool in said zone as the spool is rotated for dispensing material therefrom; and
   means movably mounting one of the upper rods for changing the spacing between said upper two rods for inserting and removing the spool into and from the storage zone between said rods, said mounting means includes a pair of opposed slots formed in the side members for movably supporting opposed ends of said one upper rod and spring means for biasing said one upper rod towards the other of said upper rods.

16. In combination at least one spool having a pair of spaced annular flanges and an intervening hub, and a rack for rotatably mounting said spool for dispensing material wound about said hub, said rack including:
   a frame having at least a pair of spaced side members;
   a plurality of rods including a pair of spaced upper rods and at least one lower rod providing a rod set extending between the side members and forming a zone between said rods for rotatably mounting and trapping the spool therein with the lower rod engaging the spool flanges and supporting the spool within said zone and the upper two rods trapping the spool in said zone as the spool is rotated for dispensing material therefrom; and
   mounting means movably mounting one of the upper rods for changing the spacing between said upper two rods for inserting and removing the spool into and from the storage zone between said rods, said mounting means including a pair of opposed slots formed in the side members for movably supporting opposed ends of said one upper rod, and spring means for biasing said one upper rod towards the other of said upper rods.

17. A rack for rotatably supporting at least one spool including:
   a frame which includes spaced side members;
   at least three spaced rods including a pair of spaced upper rods extending between the side members and forming a zone between said rods for rotatably mounting and trapping the spool therein;
   mounting means for movably mounting one of said upper rods with respect to the other of said upper rods for changing the spacing between said upper rods to permit the spool to be inserted into and removed from the zone; and
   spring means for biasing the said one rod towards the other of said upper rods enabling the spool to be inserted into and removed from said zone.

* * * * *